Patented Apr. 18, 1950

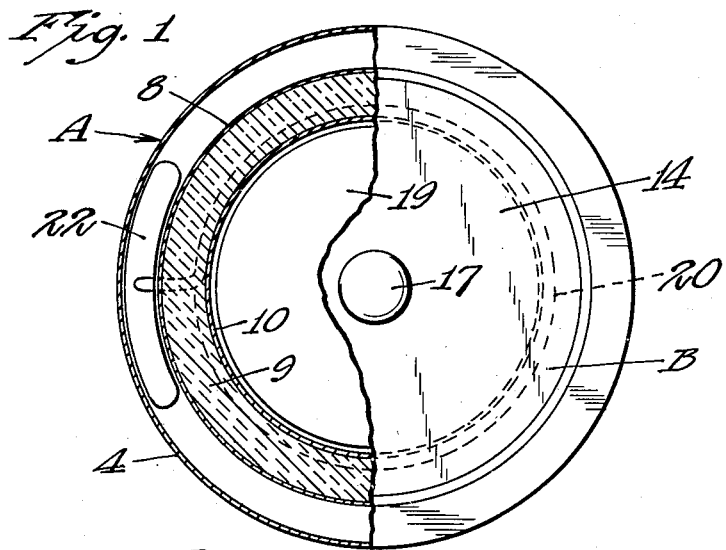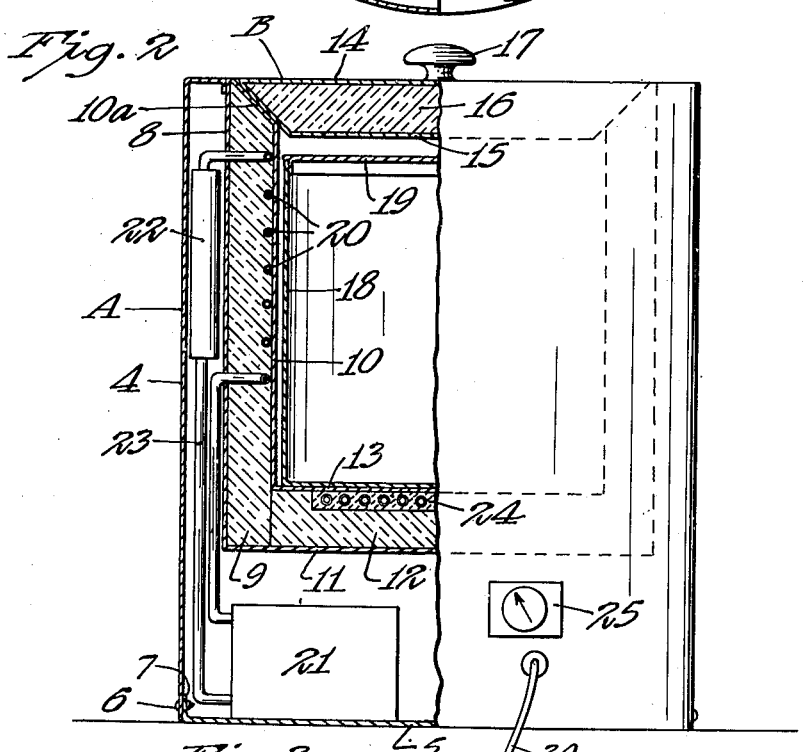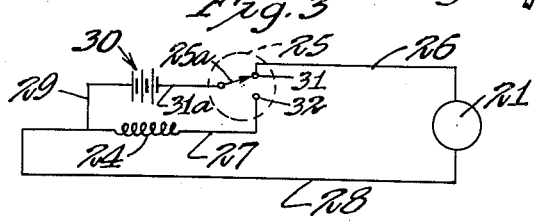

2,504,794

UNITED STATES PATENT OFFICE 2,504,794

COMBINED REFRIGERATOR AND COOKER

Hyman E. Berman and Myron S. Berman, Minneapolis, Minn.

Application December 18, 1945, Serial No. 635,845

6 Claims. (Cl. 257—3)

This invention relates to a device for processing foods.

A general object of the invention is to provide a device whereby foods can be maintained for various predetermined times under refrigeration and whereby control means forming a part of the device will operate after such predetermined periods of time to discontinue the refrigeration process and at further variable predetermined times to heat the foods and subsequently to discontinue the heating operation after the foods have been subjected to heat for a desired length of time.

Another object of the invention is to provide a combined refrigerating and heating unit having a common control wherein the heat exchange portions of the refrigerating and heating units are located in the device to secure a maximum efficiency of operation.

The above and other objects and advantages of the invention will more fully appear from the following description made in connection with the accompanying drawings, wherein like reference characters refer to the same parts throughout the views, and, in which:

Figure 1 is a plan view, partially in section, of an embodiment of the invention;

Figure 2 is an elevational view partially in section; and

Figure 3 is a diagrammatic plan of an electrical circuit for controlling the operation of the device.

There is illustrated an outer casing A having a cylindrical side wall 4 and a bottom 5 connected to the lower portion of the side wall by suitable means such as bolts 6, the upturned flanges 7 of the bottom 5 fitting within the lower portions of the side wall 4.

Located in the casing A is an inwardly concentric wall 8 having a layer of heat insulation 9 on its inner side, said layer of insulation being held on its inner side by an inner chamber wall 10. The inner chamber has a bottom 11 provided with insulation 12 and an inner bottom member 13 is also provided.

The wall 10 at its upper end is slanted outwardly as at 10a to meet the wall member 8. A cover B includes vertically spaced sheets 14 and 15 between which is a layer of insulation 16. The cover B, as shown in Figure 2, is shaped to fit into the top of the chamber provided by the walls 8 and 10 with their insulation 9 and a suitable handle 17 is secured to said cover B.

A food container 18 having a removable top 19 is designed to be located in the insulated chamber just described. In the side wall insulation 9 is a curved refrigerating coil 20. The lower end of the coil is connected to a conventional motor driven compressor 21 and the upper end of the coil 20 is connected to a condenser element 22 whose lower end is connected by a pipe 23 to the compressor 21.

Located in the bottom insulation 12 and just below the chamber bottom 13 is an electrical heating unit 24 which may be of any suitable type.

Mounted on the lower part of the outer wall 4 is a double pole time controlled switch 25 of any suitable construction and said switch 25, as shown in Figure 3, is connected by a wire 26 to the refrigerator unit compressor 21 and by a wire 27 to the heating coil 24. A wire 28 is connected between the refrigerating unit 21 and the heating unit 24, and said wire 28 is connected by a wire 29 to one side of an electrical current source 30. The current source 30 is also connected by a wire 31a to the switch arm 25a, and said arm is adapted to make selective engagement with contacts 31 and 32 when actuated by time controlled mechanism such as is commonly known in switches of this general type.

One mode of use of the device is as follows: Food can be placed in the inner compartment and the time switch 25 set for a desired period of operation of the refrigerating unit. At the end of such time the switch 25 may either shift from the contact 31 to the contact 32 immediately or to a neutral position after a desired time interval, after which it will shift to the contact 32. Thereupon the switch arm 25a will engage the contact 32 and energize the heating unit 24, and after an interval determined by the setting of the switch 25 the heating unit will be de-energized.

With a device such as we have shown and described, it is possible to place food in it and if the food is perishable it can be refrigerated for a desired length of time whereupon the refrigeration will be discontinued and the food will be cooked by the heating element 25. While stoves have been constructed with time switches to begin and discontinue heating at predetermined times and for predetermined intervals our device will maintain the foods in a refrigerated condition to prevent spoilage until it is desired to heat and cook them. This is all accomplished with a single unit which may be portable as shown in the drawings, or may be included in a relatively fixed and larger unit.

While we have described the apparatus as functioning to refrigerate and then heat, it should be understood that it may be arranged to produce cooking and subsequent refrigeration.

It will, of course, be understood that various changes may be made in the form, details, arrangement and proportions of the various parts without departing from the scope of our invention.

What we claim is:

1. A combined refrigerator and cooker comprising, an insulated chamber, an outer housing having parts thereof spaced from the outer wall portions of said chamber, refrigerating and heating units fully contained within the confines of said outer housing, and a time controlled element connected to said refrigerating and heating units and operable to discontinue the functioning of one unit and begin the functioning of the other unit.

2. A combined refrigerator and cooker comprising a housing, a chamber in said housing insulated from the remainder of said housing, a refrigerating unit fully contained in said housing, said unit having heat dissipating means outside of said chamber and heat absorbing means in heat exchange relationship to said chamber, a heating unit in said housing in heat exchange relationship to said chamber, and a time controlled switch element connected to said refrigerating and heating units and operable to discontinue the functioning of one unit and to start the functioning of the other unit.

3. A combined refrigerator and cooker comprising a housing, a chamber in said housing insulated from the rim of the housing, a refrigerating unit fully contained in said housing, said unit having heat dissipating means outside of said chamber and having heat absorbing means in heat exchange relationship to said chamber, a heating unit in said housing in heat exchange relationship to the bottom of said chamber, and a time-controlled switch element connected to said refrigerating and heating units and operable to discontinue the functioning of one unit and to start the functioning of the other unit.

4. The structure in claim 2 and said heat absorbing means of said refrigerating unit being located in heat exchange relationship to the upper part of said chamber.

5. The structure in claim 2 and said heat absorbing means of said refrigerating unit and said heating unit being disposed in spaced relation to each other, and having an insulated area between them.

6. A combined refrigerator and cooker comprising a housing, a chamber in said housing, a refrigerating unit having heat absorbing means in heat exchange relationship to said chamber, a heating unit in said housing in heat exchange relationship in said chamber, and a time controlled switch element connected to said refrigerating and heating units and operable to discontinue the functioning of one unit and start the functioning of the other unit.

HYMAN E. BERMAN.
MYRON S. BERMAN.

REFERENCES CITED

The following references are of record in the file of this patent:

UNITED STATES PATENTS

| Number | Name | Date |
|---|---|---|
| 1,848,440 | Spitzenberger et al. | Mar. 8, 1932 |
| 1,994,629 | Arkema | Mar. 19, 1935 |
| 2,054,728 | Martin | Sept. 15, 1936 |
| 2,250,029 | Moon et al. | July 22, 1941 |